UNITED STATES PATENT OFFICE.

FREDERICK H. PICKLES, OF FAIRFIELD, AND ROBERT H. PICKLES, OF MARPLE, ENGLAND.

PROCESS OF PURIFYING PYROLIGNITES.

SPECIFICATION forming part of Letters Patent No. 490,497, dated January 24, 1893.

Application filed May 24, 1892. Serial No. 434,224. (No specimens.)

*To all whom it may concern:*

Be it known that we, FREDERICK HARTLEY PICKLES, residing at Fairfield, in the county of Lancaster, and ROBERT HENRY PICKLES, residing at Marple, in the county of Chester, England, subjects of the Queen of Great Britain, have invented certain new and useful Improvements in the Purification of Pyrolignites, of which the following is a specification.

This invention relates to the purification of or separation from, the substances known as pyrolignites,—such as pyroligneous or wood acid; the brown or gray acetates (or pyrolignites) of lime; black iron liquor or pyrolignite of iron; and crude acetate of soda—of empyreumatic or tarry matters. Hitherto these pyrolignites have been purified and the tarry matters removed therefrom by slow and expensive processes such as by distillation or by crystallization or by treating them with expensive reagents.

This invention is designed to provide for the removal from such pyrolignites as above named of empyreumatic or similar impurities in an effectual and inexpensive manner and for the use of a lye or waste product for the purpose.

It consists essentially in treating the pyrolignite while in solution or in a liquid state with the carbonaceous residue obtained in the manufacture of prussiate of potash, or with a carbonaceous substance prepared by carbonizing or calcining animal matter (such as horn, leather or the like) in contact with carbonates or hydrates of the alkalies.

In carrying out the invention a solution of the pyrolignite to be purified is placed in a vat or pan in which it can be heated. To the liquid pyrolignite is then added a sufficient quantity of the prussiate residue or animal carbonaceous matter prepared as above stated and the liquor heated until it reaches boiling point. The prussiate residue or residual carbonaceous matter then combines with the empyreumatic or tarry matters. The insoluble matters are allowed to settle and may be separated from the purified liquor by any suitable process such as decanting or siphoning or filtering off the liquor or by means of a filter press or similar apparatus. The purified liquor may then be concentrated to any required specific gravity, or to dryness.

The quantity of the prussiate residue or alkaline carbonaceous matter used will be regulated to the quantity of empyreumatic or tarry impurities present in the pyrolignite. For an average sample of pyrolignite containing about twenty-five to thirty per centum of impurities we add about fifty per centum by weight of the prussiate residue to completely remove the impurities. An acetate more or less pure or free from these empyreumatic matters or impurities will thus be obtained according to the proportion of the prussiate residue or alkaline carbonaceous matter used.

Although it is understood that the alkaline carbonaceous material may be specially prepared by the carbonizing or calcining of animal matters in the presence of carbonates or hydrates of the alkalies we prefer to use for the purpose of the invention the prussiate residue now considered as waste product.

What we claim as our invention and desire to protect by Letters Patent is:—

The process of purifying pyrolignites which consists in treating a liquid pyrolignite with a quantity of the herein described prussiate residue while at the same time the temperature is raised to about the boiling point and then separating the combined insoluble matters substantially as described.

In testimony whereof we have signed our names to this specification in the presence of two subscribing witnesses.

F. H. PICKLES.
R. H. PICKLES.

Witnesses:
J. OWDEN O'BRIEN,
CHAS. OVENDALE.